United States Patent
Kämmerer et al.

(10) Patent No.: US 7,216,915 B2
(45) Date of Patent: May 15, 2007

(54) VEHICLE SEAT, PARTICULARLY A MOTOR VEHICLE SEAT

(75) Inventors: Joachim Kämmerer, Kaiserslautern (DE); André Böhm, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/416,540

(22) Filed: May 3, 2006

(65) Prior Publication Data
US 2006/0214459 A1    Sep. 28, 2006

Related U.S. Application Data

(63) Continuation of application No. PCT/EP2004/012820, filed on Nov. 12, 2004.

(30) Foreign Application Priority Data
Nov. 28, 2003 (DE) ............... 103 55 819

(51) Int. Cl.
*B60N 2/14* (2006.01)
(52) U.S. Cl. .................. 296/65.09
(58) Field of Classification Search ........... 296/65.05, 296/65.09
See application file for complete search history.

(56) References Cited

U.S. PATENT DOCUMENTS

| | | | |
|---|---|---|---|
| 2,152,505 A * | 3/1939 | Stuart et al. ............ | 296/65.09 |
| 2,565,666 A | 8/1951 | Schaefer | |
| 3,703,310 A | 11/1972 | Lystad | |
| 4,736,985 A | 4/1988 | Fourrey et al. | |
| 5,482,349 A | 1/1996 | Richter et al. | |
| 5,979,985 A | 11/1999 | Bauer et al. | |
| 6,024,406 A | 2/2000 | Charras et al. | |
| 6,382,491 B1 | 5/2002 | Hauser et al. | |
| 6,572,171 B1 | 6/2003 | Pautz et al. | |
| 6,595,588 B2 | 7/2003 | Ellerich et al. | |
| 6,991,293 B2 * | 1/2006 | Lang et al. ................. | 297/336 |
| 2002/0130542 A1 | 9/2002 | Ellerich et al. | |

FOREIGN PATENT DOCUMENTS

| | | |
|---|---|---|
| DE | 814 708 | 9/1951 |
| DE | 2 107 231 | 8/1972 |
| DE | 199 43 573 A1 | 3/2001 |
| DE | 199 64 143 A1 | 3/2001 |
| EP | 0 364 146 A2 | 4/1990 |
| EP | 0 888 926 B1 | 1/1999 |
| FR | 1 531 807 | 7/1968 |
| FR | 2 524 285 | 10/1983 |
| WO | WO 02/100679 A1 | 12/2002 |

* cited by examiner

*Primary Examiner*—Dennis H. Pedder
(74) *Attorney, Agent, or Firm*—Womble Carlyle Sandridge & Rice, PLLC

(57) ABSTRACT

In the case of a vehicle seat (1), in particular a motor vehicle seat, having a seat cushion (3) and a backrest (4) which are connected movably and/or releasably to the vehicle structure (S), it being possible for the vehicle seat (1) to be transferred from a design position into at least one other position, the backrest (4) is coupled to the vehicle structure (S) by way of at least one link (12, 14), a pivoting movement of the provided links (12, 14) at least in phases predetermining a displacement of the backrest (4) forward, as a result of which the vehicle seat (1) takes up a front use position.

19 Claims, 5 Drawing Sheets

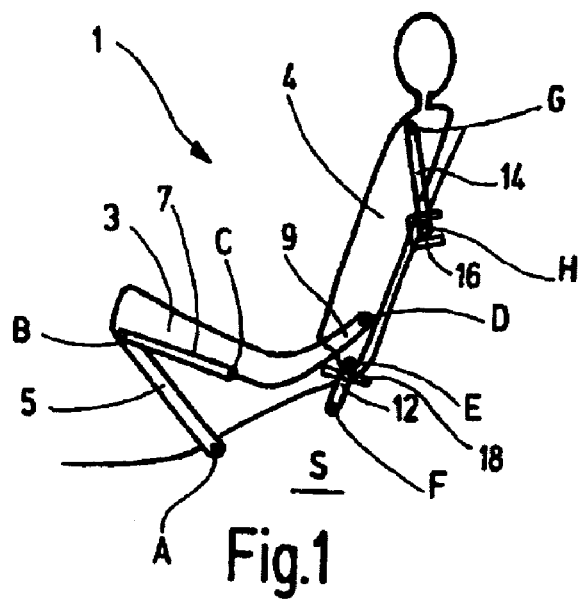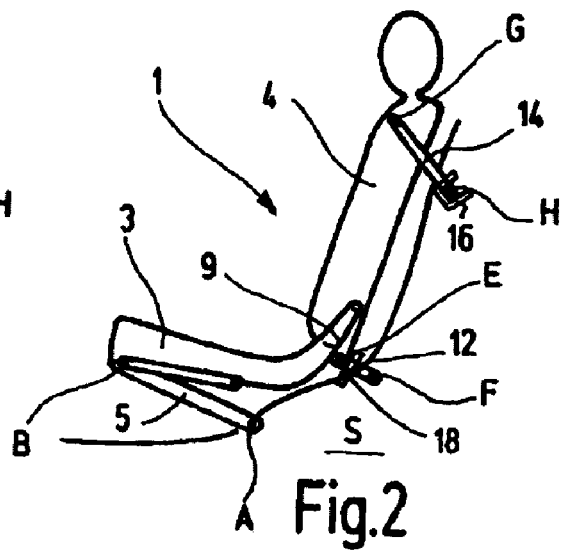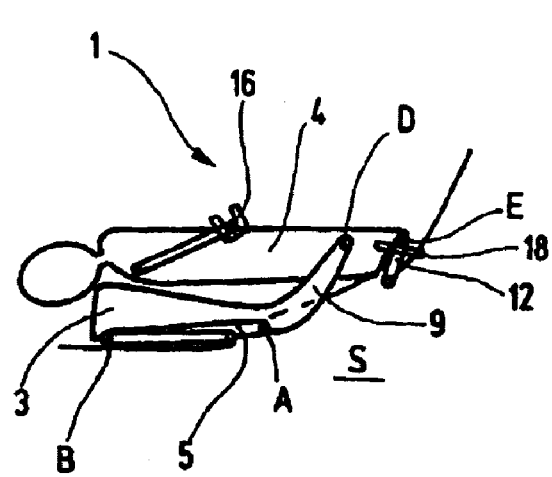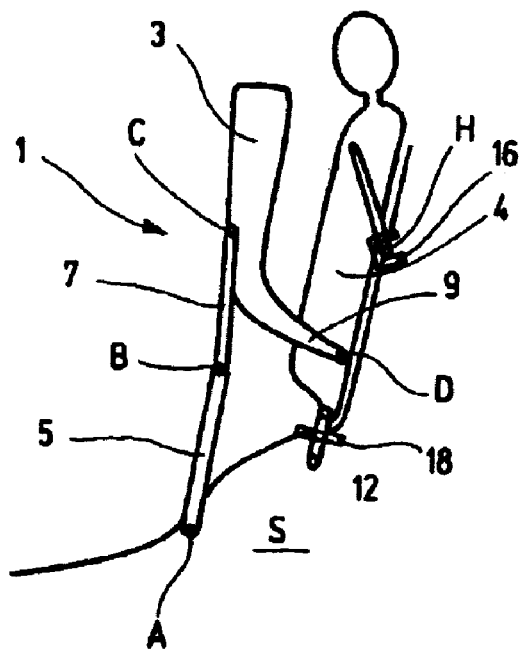

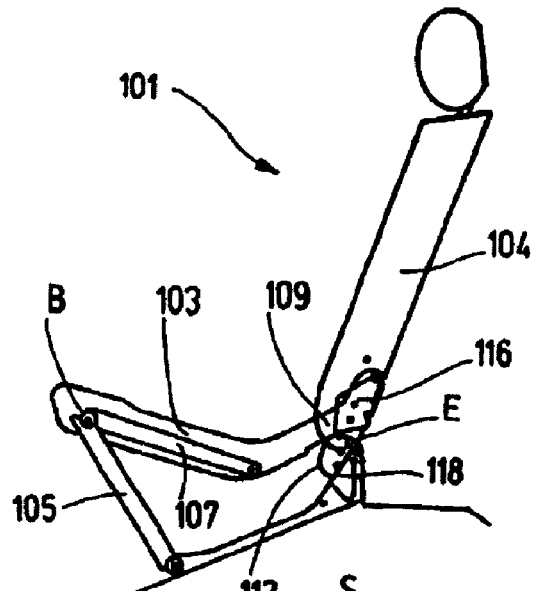
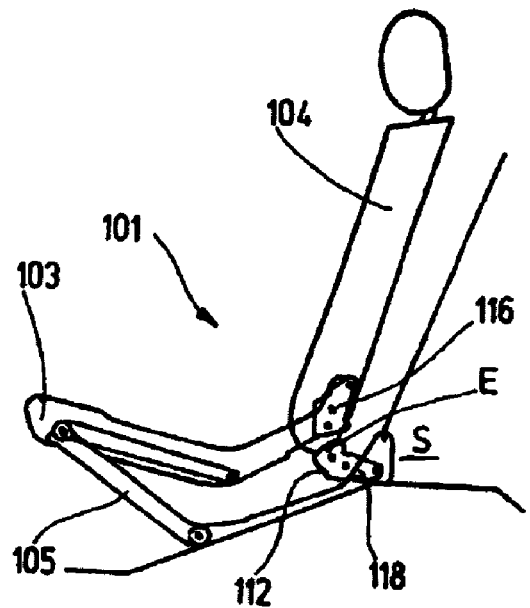
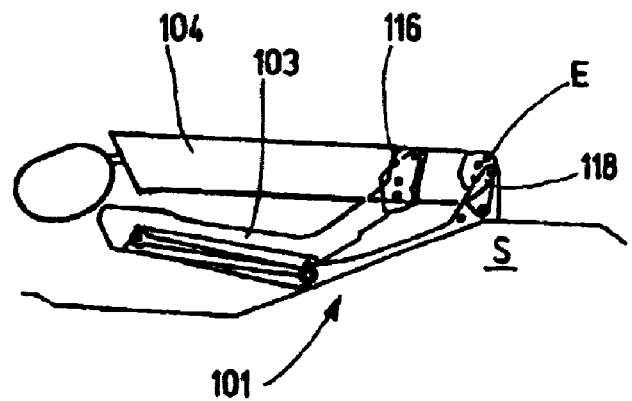
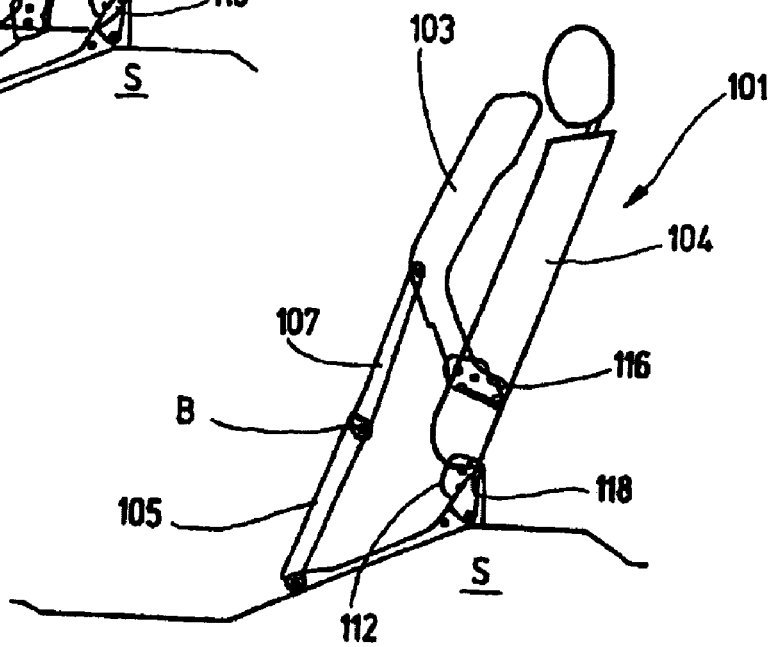
Fig.9
Fig.10
Fig.11
Fig.12

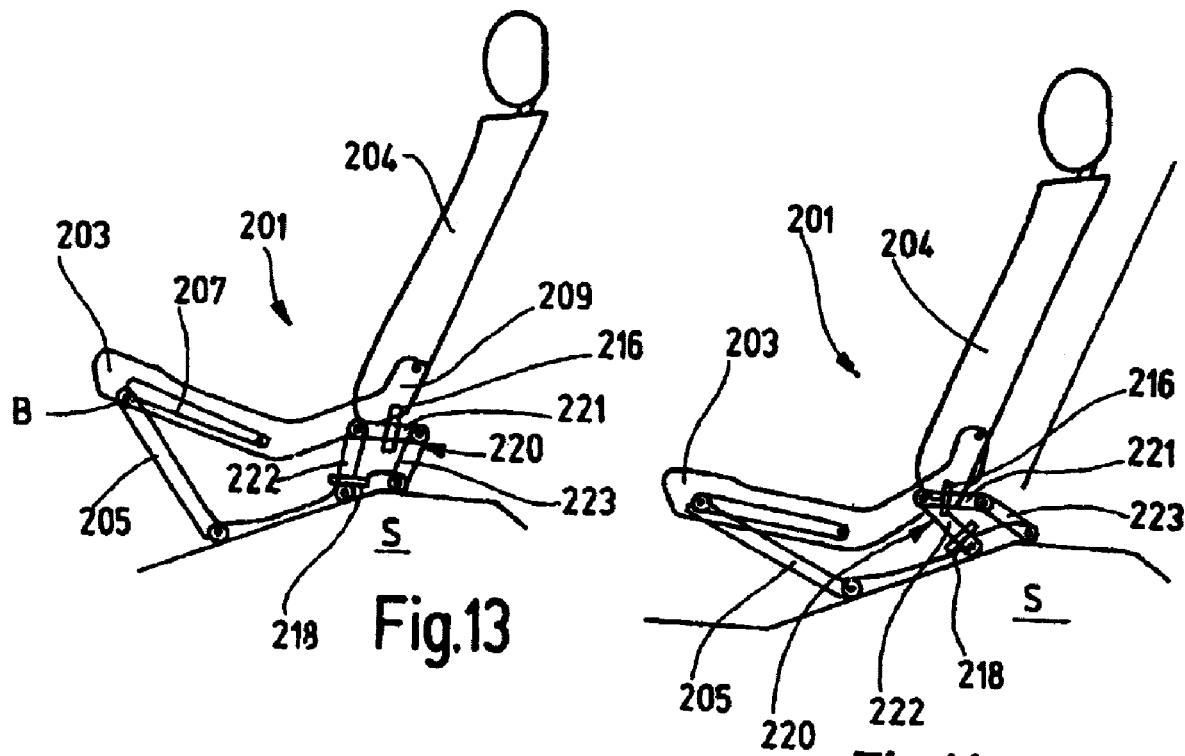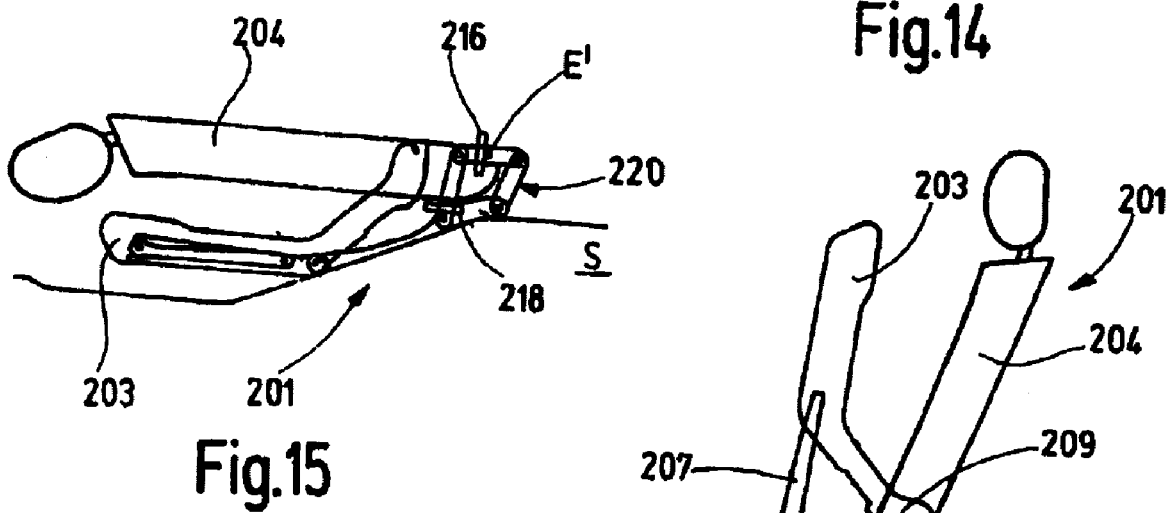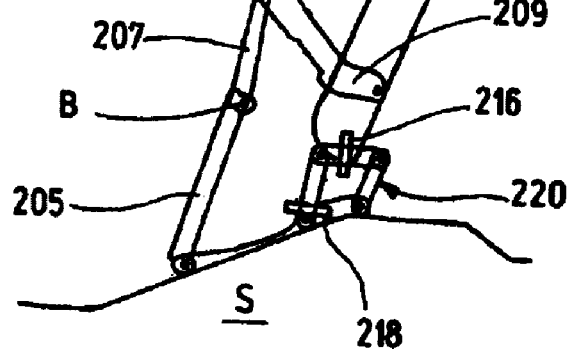

VEHICLE SEAT, PARTICULARLY A MOTOR VEHICLE SEAT

CROSS-REFERENCE TO RELATED APPLICATION

The present application is a continuation of International Application
PCT/EP2004/012820, which was filed Nov. 12, 2004. The entire disclosure of
PCT/EP2004/012820 is incorporated herein by reference.

BACKGROUND OF THE INVENTION

The present invention relates to a vehicle seat, in particular a motor vehicle seat, having a seat cushion and a backrest which are connected movably and/or releasably to the vehicle structure, with it being possible for the vehicle seat to be transferred from a design position to at least one other position.

In the case of a known vehicle seat of the type described immediately above, the backrest is locked to the C-pillar of the vehicle structure. After the catch is released, the backrest can be folded forward, so that the trunk space is enlarged.

BRIEF SUMMARY OF SOME ASPECTS OF THE INVENTION

One aspect of the present invention is the provision of improvements to a vehicle seat, in particular a motor vehicle seat, having a seat cushion and a backrest which are connected movably and/or releasably to the vehicle structure, with it being possible for the vehicle seat to be transferred from a design position to at least one other position. In accordance with one aspect of the present invention, the at least one other position comprises a front use position. In accordance with this aspect, the backrest is connected to the vehicle structure by means of at least one link. A pivoting movement (which occurs at least in phases) of the at least one link predetermines a forward displacement of the backrest as the vehicle seat is transferred to the front use position.

Because the backrest is connected to the vehicle structure by means of at least one link, with a pivoting movement (at least in phases) of the provided link(s) predetermining a displacement of the backrest forward, as a result of which the vehicle seat takes up a front use position, a simple longitudinal adjustment is available which expands the possibilities of adjustment and, as a result, increases the seating comfort without complicated rails being necessary, which makes the vehicle seat according to one aspect of the invention more cost-effective. The displacement of the backrest can take place in one or more phases during which different catches are opened and closed. If the front position is defined as the design position, then the pivoting movement of the link naturally brings about a displacement of the backrest to the rear and therefore a transfer into a rear use position.

The backrest may be connected, for example at its upper end, to the vehicle structure by means of an (upper) link. Particularly clear and unambiguous means of guiding the backrest are produced if the backrest is connected to the vehicle structure by means of a lower link and an upper link, or at least two other four-bar-linkage links, with a four-bar linkage being formed, or if the backrest is guided movably relative to the vehicle structure by means of a sliding element in addition to the link. Since occupants who prefer a front use position because of their short thighs generally also have shorter lower legs, it is advantageous if the transfer into the front use position is linked to a reduction in the seat height. For this purpose, the backrest is preferably slightly lowered while being pushed forward, preferably with a lowering movement of the seat cushion occurring at the same time.

A first lock is preferably provided which locks the link releasably to the vehicle structure or to the backrest, or locks the backrest releasably to the seat cushion or to the vehicle structure. It is possible, after release of the first lock, for the backrest to be pivoted onto the seat cushion, as a result of which the vehicle seat takes up a floor position, or, if the seat cushion does not drop down, a table position.

A preferred coupling of the movement of the seat cushion to the movement of the backrest is achieved if the seat cushion is connected, on the one hand, by means of at least one front link to the vehicle structure and, on the other hand, to the backrest. This coupling of the seat cushion preferably defines a four-bar linkage or another multi-bar linkage which, during the transfer into the floor position, is moveable—at the latest after a catch is released—so that the pivoting backrest can lower the seat cushion downward by means of this four-bar linkage. The multi-bar linkage may also be used in such a manner that the seat cushion, during the transfer into the front use position, is pushed forward, and optionally at the same time the multi-bar linkage may form the four-bar linkage for the coupling of the backrest.

The vehicle seat can preferably take up a package position, in which the seat cushion is folded onto the backrest, thus making storage space available in front of the vehicle seat. The seat cushion, the backrest which is connected rigidly to the vehicle structure for this transfer, the front link and a coupler preferably define a four-bar linkage by means of which the required movement of the seat cushion preferably takes place in a defined manner. The coupler may be provided between the front link and the seat cushion and may be normally locked to the seat cushion. After unlocking, the front link and the coupler can stretch out relative to each other, as a result of which the seat cushion folds upward at the front end until the upper side of the seat cushion rests against the backrest when the front link and the coupler are in a stretched-out position with respect to each other. However, the front link and the coupler may also take up a different position relative to each other in the package position. The coupler may alternatively be provided between the seat cushion and backrest, it drawing along the rear end of the seat cushion during the folding-upward operation until the lower side of the seat cushion rests on the backrest.

During each transfer into a different position there is preferably in each case only one degree of freedom, and preferably at most one catch per vehicle seat side has to be opened.

Other aspects and advantages of the present invention will become apparent from the following.

BRIEF DESCRIPTION OF THE DRAWINGS

The present invention is explained in more detail below with reference to four exemplary embodiments and two modifications illustrated in the drawings, in which:

FIG. 1 shows a side view of the first exemplary embodiment in the design position, FIG. 2 shows a view corresponding to FIG. 1 in the front use position, FIG. 3 shows a view corresponding to FIG. 1 in the floor position, FIG. 4 shows a view corresponding to FIG. 1 in the package position, FIG. 9 shows a side view of the second exemplary embodiment in the design position, FIG. 10 shows a view corresponding to FIG. 9 in the front use position, FIG. 11 shows a view corresponding to FIG. 9 in the floor position, FIG. 12 shows a view corresponding to FIG. 9 in the package position, FIG. 13 shows a side view of the third exemplary embodiment in the design position, FIG. 14 shows a view corresponding to FIG. 13 in the front use position, FIG. 15 shows a view corresponding to FIG. 13 in the floor position, FIG. 16 shows a view corresponding to FIG. 13 in the package position.

DESCRIPTION OF EXEMPLARY EMBODIMENTS

Figure 5:
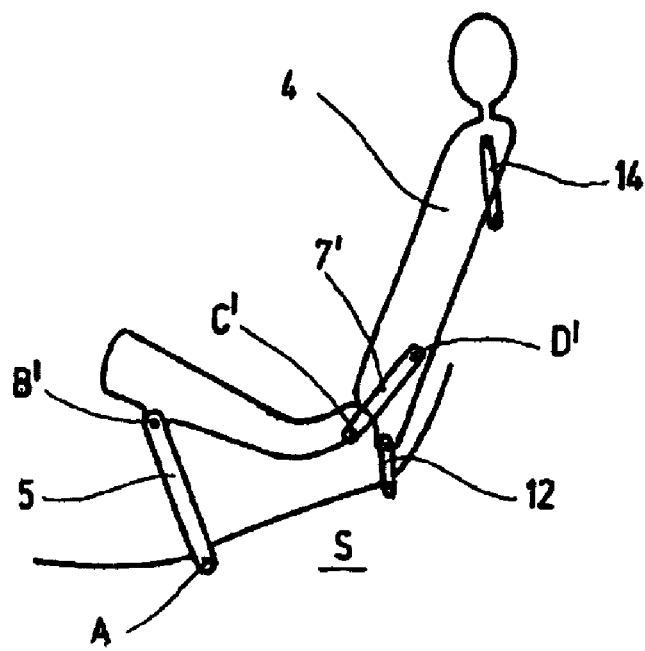
FIG. 5 shows a view corresponding to FIG. 1 of the first modification in the design position.
Figure 6:
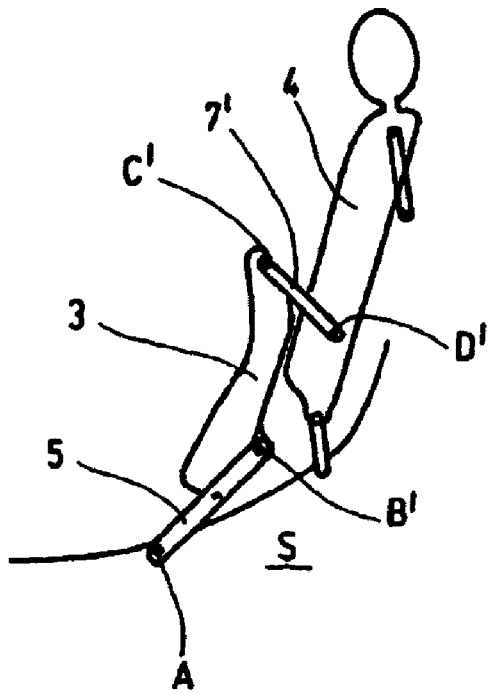
FIG. 6 shows a view corresponding to FIG. 5 in the package position.
Figure 7:
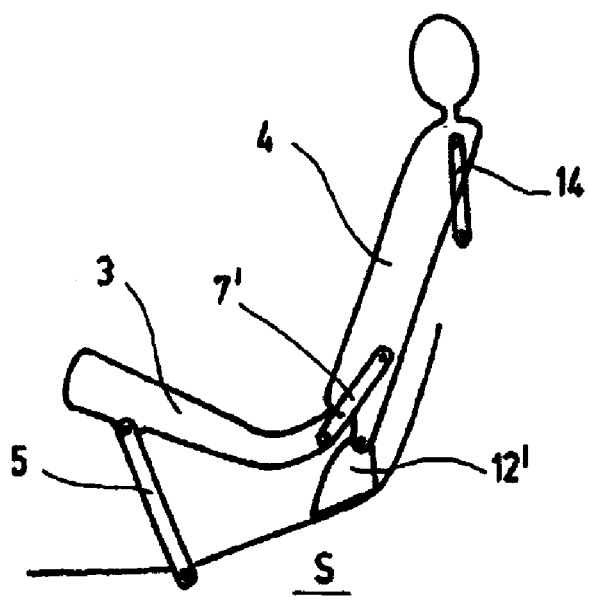
FIG. 7 shows a view corresponding to FIGS. 1 and 5 of the second modification in the design position.
Figure 8:
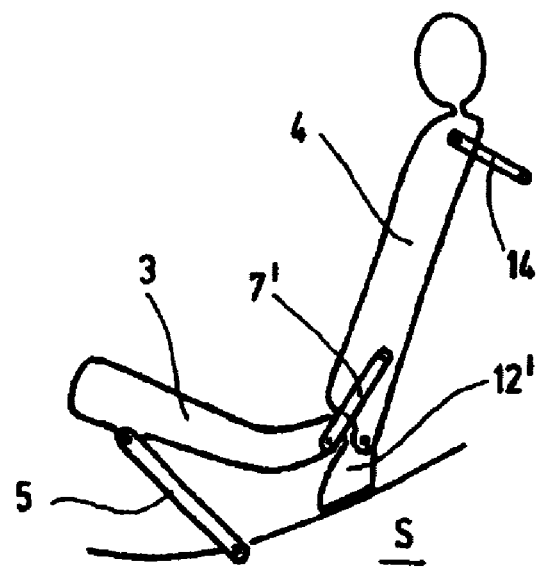
FIG. 8 shows a view corresponding to FIG. 7 in the front use position.
Figure 17:
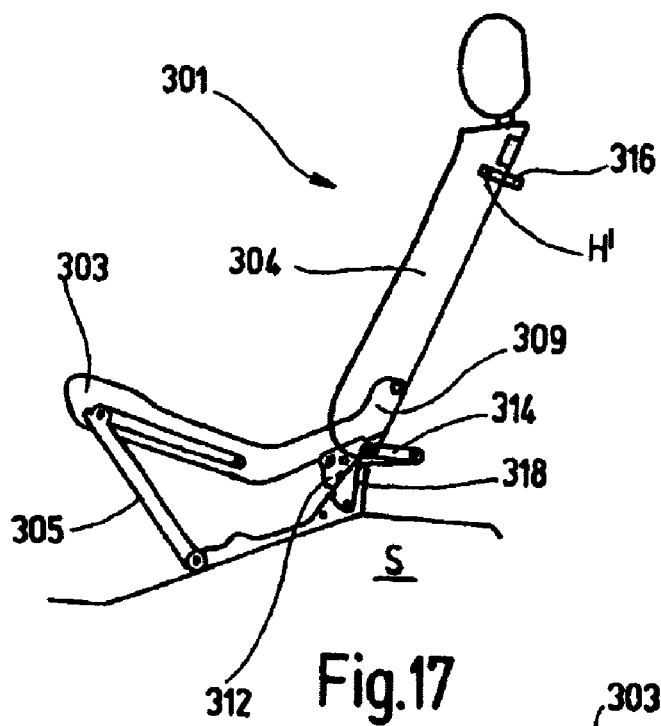
FIG. 17 shows a side view of the fourth exemplary embodiment in the design position.
Figure 18:
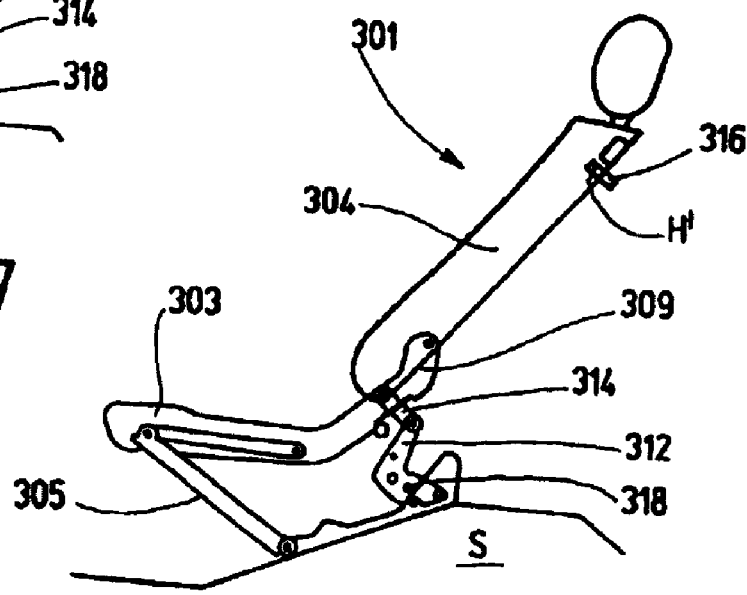
FIG. 18 shows a view corresponding to FIG. 17 in an intermediate position.
Figure 19:
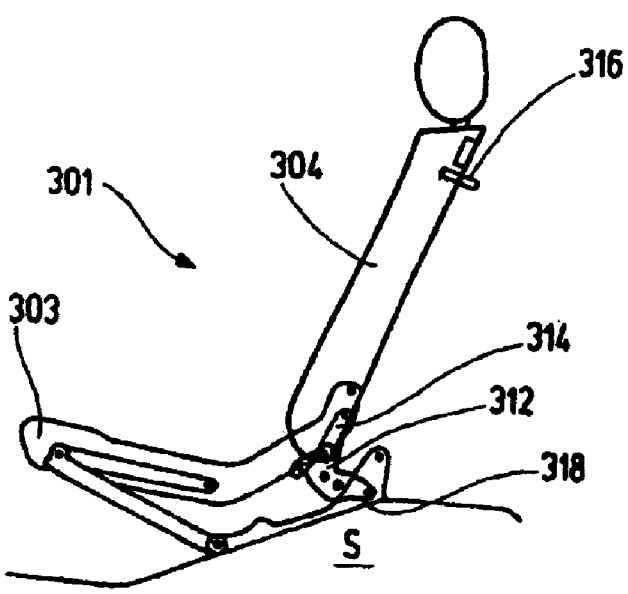
FIG. 19 shows a view corresponding to FIG. 17 in the front use position.

In the first exemplary embodiment, a vehicle seat 1 for a rear row of seats in a motor vehicle has a seat cushion 3 and a backrest 4. The orientation of the vehicle seat 1 in the motor vehicle and the usual direction of travel thereof determine the directional details used below. The term seat cushion 3 is to be understood as meaning the entire unit with support structure, upholstery and cover. The design position, which is one of the two possible sitting use positions, is described first in the following.

A pivotable front link 5 is connected at its lower, rear end at a first coupling point A of the vehicle structure S of the motor vehicle. The front link 5 extends obliquely forward and upward, and is connected in the region of the front end of the seat cushion 3 to a coupler 7. This coupling point is referred to as second coupling point B. The coupler 7 bears against the lower side of the seat cushion 3, and is connected at its rear end at a third coupling point C to the seat cushion 3. The front end of the coupler 7, which has the second coupling point B, is locked releasably to the seat cushion 3. An arm 9 is provided fixedly at the rear end of the seat cushion 3. The arm 9 points obliquely rearward and upward, and is connected at a fourth coupling point D to the backrest 4.

A pivotable lower link 12 (e.g., a rear link) is connected to the lower end of the backrest at a fifth coupling point E. The lower link 12 is used to couple the backrest 4 at a sixth coupling point F to the vehicle structure S. An upper end of a pivotable upper link 14 (e.g., a rear link) is connected to the backrest 4 at a seventh coupling point G. The upper link 14 is used to couple the backrest 4 releasably to the vehicle structure S at an eighth coupling point H, in the present case with a first lock 16 which permits a rotation of the upper link 14 about the eighth coupling point H. The eighth coupling point H is designed, for example, as a bolt. The coupling point H is provided, for example, on the C-pillar of the motor vehicle. A second lock 18 is provided, for example, on the lower link 12. The second lock 18 locks the lower link 12 releasably to a bolt of the vehicle structure S. The two locks 16 and 18 stabilize the backrest 4 which in turn stabilizes the seat cushion 3.

The vehicle seat 1 can be transferred from the design position into a front use position. For this purpose, the second lock 18 is unlocked, so that the lower link 12 is movable. A four-bar linkage is defined between the coupling points E, F, H and G and can be used to push the backrest 4 forward and at the same time to lower it somewhat. Typically, the backrest 4 is grasped and pulled forward. At the same time, a five-bar linkage is defined between the coupling points A, B, D, E and F, but due to the limited possibility of movement of the backrest 4 this five-bar linkage acts only as a four-bar linkage. The five-bar linkage—driven by the backrest 4—pushes the seat cushion 3 forward and also lowers it downward somewhat. The vehicle structure S is preferably configured in such a manner that the second lock 18 can lock again to it, preferably to a further bolt of the vehicle structure S.

Furthermore, the vehicle seat 1 can be transferred from the design position into a flat floor position. For this purpose, the first lock 16 is unlocked, so that the backrest 4 can pivot forward and downward about the fifth coupling point E. A further four-bar linkage is defined between the coupling points A, B, D and E, by means of which the backrest 4 presses the seat cushion 3 downward.

Finally, the vehicle seat 1 can be transferred from the design position into a package position. For this purpose, the simple latch-type catch provided at the second coupling point B is opened, as a result of which the coupler 7 is moveable relative to the seat cushion 3. A further four-bar linkage is defined between the coupling points A, B, C and D and permits a defined folding upward of the seat cushion 3 about the fourth coupling point D. The front link 5 and the coupler 7 take up a stretched-out position with respect to each other when the package position is reached.

A first modification to the first exemplary embodiment corresponds—if not described differently below—with the first exemplary embodiment; therefore, identical components bear the same reference numbers. It is essentially the position of the coupler 7' which is changed. The front link 5 is connected to the seat cushion 3 directly at the second coupling point B', whereas the coupler 7' is arranged in the rear region of the seat cushion 3 instead of the arm. The coupler 7' is connected, on the one hand, at the third coupling point C' to the seat cushion and, on the other hand, at the fourth coupling point D' to the backrest 4. The transfer from the design position into the front use position or into the floor position largely corresponds to that of the first exemplary embodiment. By contrast, the package position differs. The coupler 7' pivots upward and in the process carries the rear end of the seat cushion 3 along the backrest 4. The front link 5 ensures that the front end of the seat cushion 3 bears against the foot region of the backrest 4, i.e. in the present case the region of the lower link 12. In the position reached, the seat cushion 3, which is folded onto the backrest 4, is rotated through approximately 180° in relation to the exemplary embodiment.

A second modification corresponds—if not described differently below—with the first exemplary embodiment and/or the first modification and so identical components bear the same reference numbers. Essentially, instead of the lower link 12 a sliding element 12' is provided which is displaceable relative to the vehicle structure S in an obliquely extending guide. The transfer into the floor position and the package position, for which purpose the backrest 4 is only pivoted or is not moved at all, does not differ. By contrast, during the transfer into the front use position, the sliding movement 12' is pushed obliquely downward along the vehicle structure S. By means of this four-bar linkage, the backrest 4 moves forward and slightly downward, it correspondingly moving the seat cushion 3 forward.

In order to reinforce the load absorption of the upper link 14 in the event of a crash, provision is made in further modifications for the backrest 4 to be locked in the design position to the vehicle structure S by means of an additional intercepting latch in the region of the upper link 14, or of a locking hinge in the region of the pivot point of the backrest, or of a further backrest lock on the upper link 14. It is likewise possible to lock the upper link 14 to the backrest 4 for this.

The second exemplary embodiment corresponds with the first exemplary embodiment if not described differently below and so components which are identical and act in an identical manner bear reference numbers incremented by 100. The difference between the first and second exemplary embodiments is that, in the case of the vehicle seat 101 of the second exemplary embodiment, an upper link is not provided. This has the advantage of not requiring the backrest 104 to be connected to the C-pillar. Instead, the first lock 116 is fixed on the arm 109 and locks this arm 109 to the backrest 104.

As in the first exemplary embodiment, for the transfer into the front use position, the second lock 118, which is locked to a bolt of the vehicle structure S, is unlocked and releases the lower link 112 (e.g., a rear link), so that the seat cushion 103, which is mounted by means of a four-bar linkage, moves forward and downward by means of pivoting movements of the front link 105 and the lower link 112. This four-bar linkage at the same time defines the four-bar linkage for the coupling of the backrest 104. In this case, the first lock 116 keeps the backrest 104 stable in its inclination. The second lock 118 locks in the front use position to a further bolt of the vehicle structure S. For transfer into the floor position, the first lock 116 is unlocked and the second lock 118 remains locked, so that the backrest 104 can pivot about the coupling point E and in the process presses the seat cushion 103 downward. In the floor position, the first lock 116 can lock to the backrest 104 in a different relative position. For the transfer into the package position, the first lock 116 and the coupler 107 are likewise unlocked at the coupling point B and can be used to fold the seat cushion 103 upward. Also in the package position, the first lock 116 locks again to the backrest 104 in a different relative position.

The third exemplary embodiment corresponds with the first exemplary embodiment if not described differently below and so components which are identical and act in an identical manner bear reference numbers incremented by 200. Whereas the seat cushion 203 of this vehicle seat 201 is connected by means of a front link 205 (and a coupler 207) to the vehicle structure S and, at the arm 209 arranged at the rear, connected to the backrest 204, the four-bar linkage 220 for attaching the backrest 204 is designed separately. A first four-bar linkage link 221 (e.g., a rear link) is connected in its center at point E' to the lower end of the backrest 204 and is locked thereto by means of the first lock 216. A second four-bar linkage link 222 (e.g., a rear link) is connected, on the one hand, to the front end of the first four-bar linkage link 221 and, on the other hand, to the vehicle structure S and is locked to the vehicle structure by means of the second lock 218.

For the transfer into the front use position, the second lock 218 unlocks the four-bar linkage 220, so that the seat cushion 203, which is likewise mounted by means of a four-bar linkage, can be moved forward and downward, the second lock 218 then locking to the vehicle structure S in a different relative position. For the transfer into the floor position, the first lock 216 is unlocked and the second lock 218 remains locked, so that the backrest 204 can pivot about the point E' and in the process presses the seat cushion 203 downward. In the floor position, the first lock 216 locks to the backrest 204 in a different relative position. For the transfer into the package position, the coupler 207 is unlocked and can be used to fold the seat cushion 203 upward. The package position is secured by a stretched-out position of front link 205 and coupler 207. One advantage of this third exemplary embodiment is that the backrest 204 does not need to be connected to the C-pillar.

The fourth exemplary embodiment corresponds with the first exemplary embodiment if not described differently below and so components which are identical and act in an identical manner bear reference numbers incremented by 300. Although the backrest 304 of this vehicle seat 301 continues to be connected to the vehicle structure S by means of a lockable four-bar linkage, the mechanism elements are arranged differently. The upper link 314 (e.g., a rear link) is connected to the lower end of the backrest 304 while the lower link 312 (e.g., a rear link) is connected, on the one hand, to the upper link 314 and, on the other hand, to the vehicle structure S. The backrest 304 is connected at the upper end by means of the first lock 316 at the coupling point H' releasably to the vehicle structure S, for example to a bolt fixed on the vehicle structure. The second lock 318 locks the lower link 312 to the vehicle structure S. The coupling of the seat cushion 303 to front link 305 and arm 309 corresponds to that of the first exemplary embodiment.

However, the transition into the front use position takes place in two phases. In a first phase, the second lock 318 is unlocked, whereupon the lower end of the backrest 304 slides forward and in the process the seat cushion 303 likewise moves forward. During this, the upper end of the backrest 304 remains connected to the vehicle structure S, i.e. the inclination of the backrest changes. The first lock 316 is then unlocked in a second phase, so that the upper end of the backrest 304 also slides forward, as a result of which the seat cushion 303 is lowered and the original inclination of the backrest is restored. The first lock 316 can then lock again to the vehicle structure S, for example to a further bolt fixed on the vehicle structure. The floor position and the package position can be reached corresponding to the other exemplary embodiments. In particular, for the package position a coupler with is locked releasably to the seat cushion 303 is again provided and, after being unlocked, permits the seat cushion 303 to fold upward.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A vehicle seat for being connected to a vehicle structure, the vehicle seat comprising:
   a seat cushion for extending at least generally horizontally in a rear use position of the vehicle seat;

a backrest for extending uprightly from proximate the seat cushion during the rear use position;

a coupler for being releasably locked to the seat cushion;

at least one front link for being at least indirectly connected to the vehicle structure, wherein the seat cushion, the front link and the coupler are cooperative to at least partially define a multi-bar linkage while the coupler is unlocked with respect to the seat cushion, and the multi-bar linkage is operative so that the vehicle seat can be transferred from the rear use position to a package position by reconfiguring the multi-bar linkage, and the reconfiguring of the multi-bar linkage comprises the seat cushion pivoting upward so that the front link and the coupler are stretched-out with respect to one another while the vehicle seat is in the package position;

wherein the vehicle seat can also be transferred from the rear use position to a front use position;

wherein the vehicle seat being transferred from the rear use position to the front use position comprises a forward displacement of the backrest; and wherein the vehicle seat includes at least one rear link for coupling the backrest to the vehicle structure in a manner so that the at least one rear link pivots at least in phases to at least partially control the forward displacement of the backrest.

2. The vehicle seat according to claim 1, wherein the seat cushion, the front link and the coupler being cooperative to at least partially define the multi-bar linkage comprises:

the coupler being pivotably connected to the seat cushion, and the front link being pivotably connected to the coupler.

3. The vehicle seat according to claim 1, wherein the multi-bar linkage is a four-bar linkage.

4. The vehicle seat according to claim 1, wherein:

the multi-bar linkage is a first multi-bar linkage, and the seat cushion and the at least one rear link are cooperative to at least partially define a second multi-bar linkage, and so that the vehicle seat being transferred from the rear use position to the front use position comprises a reconfiguring of the second multi-bar linkage.

5. The vehicle seat according to claim 4, wherein the first multi-bar linkage is a four-bar linkage, and the second multi-bar linkage is a four-bar linkage.

6. The vehicle seat according to claim 4, wherein the front link, which is part of the first multi-bar linkage, is also part of the second multi-bar linkage.

7. The vehicle seat according to claim 1, wherein the vehicle seat being transferred from the rear use position to the front use position further comprises the backrest being slightly lowered during the forward displacement of the backrest.

8. The vehicle seat according to claim 1, further comprising at least one lock, wherein:

after releasing the lock, the vehicle seat can be transferred to a floor position by pivoting the backrest onto the seat cushion, and the at least one lock is selected from the group consisting of:

a lock for releasably locking the rear link to the vehicle structure, a lock for releasably locking the rear link to the backrest, a lock for releasably locking the backrest to the seat cushion, and a lock for releasably locking the backrest to the vehicle structure.

9. The vehicle seat according to claim 1, wherein the seat cushion is coupled to the backrest so that the backrest is part of the multi-bar linkage.

10. The vehicle seat according to claim 9, wherein the multi-bar linkage is a four-bar linkage.

11. A vehicle seat for being connected to a vehicle structure, the vehicle seat comprising:

a seat cushion for extending at least generally horizontally in a use position of the vehicle seat;

a backrest for extending uprightly from proximate the seat cushion during the use position;

a coupler for being releasably locked to the seat cushion;

at least one front link for being at least indirectly connected to the vehicle structure, wherein the seat cushion, the front link and the coupler are cooperative to at least partially define a first multi-bar linkage while the coupler is unlocked with respect to the seat cushion, and the first multi-bar linkage is operative so that the vehicle seat can be transferred from the use position to a package position by reconfiguring the first multi-bar linkage, and the reconfiguring of the first multi-bar linkage comprises the seat cushion pivoting upward so that the front link and the coupler are stretched-out with respect to one another while the vehicle seat is in the package position;

wherein after releasing at least one lock, the vehicle seat can be transferred from the use position to a floor position;

wherein the vehicle seat being transferred from the use position to the floor position comprises the backrest being forwardly pivoted onto the seat cushion, and the seat cushion being lowered; and a second multi-bar linkage is operative so that the seat cushion being lowered occurs in response to the backrest being forwardly pivoted onto the seat cushion.

12. The vehicle seat according to claim 11, wherein:

the use position of the vehicle seat is a rear use position;

the vehicle seat can also be transferred from the rear use position to a front use position;

the vehicle seat being transferred from the rear use position to the front use position comprises a forward displacement of the backrest; and the vehicle seat includes at least one rear link for coupling the backrest to the vehicle structure in a manner so that the at least one rear link pivots at least in phases to at least partially control the forward displacement of the backrest.

13. The vehicle seat according to claim 11, wherein the first multi-bar linkage is a four-bar linkage, and the second multi-bar linkage is a four-bar linkage.

14. The vehicle seat according to claim 11, wherein the second multi-bar linkage includes the front link and the seat cushion.

15. The vehicle seat according to claim 14, wherein the second multi-bar linkage is a four-bar linkage.

16. The vehicle seat according to claim 14, wherein the seat cushion is coupled to the backrest so that the backrest is part of the second multi-bar linkage.

17. The vehicle seat according to claim 1,
the multi-bar linkage is a first multi-bar linkage; and
a second multi-bar linkage is operative so that the seat cushion is moved forward while the vehicle seat is transferred from the rear use position to the front use position.

18. The vehicle seat according to claim 17, wherein the seat cushion and the at least one rear link are cooperative:
to at least partially define a third multi-bar linkage, and
so that the vehicle seat being transferred from the rear use position to the front use position comprises a reconfiguring of the third multi-bar linkage.

19. The vehicle seat according to claim 18, wherein the second multi-bar linkage at least partially defines the third multi-bar linkage.

* * * * *